(12) United States Patent
Hamada et al.

(10) Patent No.: US 7,700,229 B2
(45) Date of Patent: Apr. 20, 2010

(54) PACKING, PRODUCTION METHOD OF CRIMP ASSEMBLY, PRODUCTION METHOD OF BATTERY HOUSING LID, AND PRODUCTION METHOD OF BATTERY

(75) Inventors: Shinji Hamada, Toyohashi (JP); Toyohiko Eto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1133 days.

(21) Appl. No.: 11/147,311

(22) Filed: Jun. 8, 2005

(65) Prior Publication Data

US 2005/0278941 A1    Dec. 22, 2005

(30) Foreign Application Priority Data

Jun. 17, 2004  (JP)  ............................. 2004-180213

(51) Int. Cl.
H01M 2/08  (2006.01)
F16J 15/10  (2006.01)

(52) U.S. Cl. .................. 429/174; 429/170; 429/171; 429/172; 429/178; 429/179; 429/180; 429/181; 429/185; 277/644; 277/650

(58) Field of Classification Search ................ 429/171, 429/174, 181, 184, 185, 170, 172, 178, 179, 429/180; 277/650, 644; 403/278
See application file for complete search history.

(56) References Cited

U.S. PATENT DOCUMENTS 1,931,315 A * 10/1933 Brook ..................... 49/479.1

| 2002/0058184 A1* | 5/2002 | Hayashi et al. ............. 429/180 |
| 2003/0118899 A1* | 6/2003 | Kometani et al. ............ 429/161 |
| 2004/0023108 A1* | 2/2004 | Nakanishi et al. ............ 429/178 |
| 2004/0248002 A1 | 12/2004 | Asahina et al. |

FOREIGN PATENT DOCUMENTS

| EP | 1 039 565 A2 | 9/2000 |
| JP | A-08-077999 | 3/1996 |
| JP | A-2005-004975 | 1/2005 |
| WO | WO03057082 | * 7/2003 |

OTHER PUBLICATIONS

Plastic, The Hutchinson Unabridged Encyclopedia with Atlas and Weather guide, 2008, [online], [retrieved on Nov. 21, 2008], Retrieved from Credoreference using Internet <URL: http://www.credoreference.com/entry/7977823>.*

German Language Office Action for German Office Action, Appln. No. 10 2005 027 679.2-45 issued Apr. 5, 2007.

German Translation for German Office Action, Appln. No. 10 2005 027 679.2-45 issued Apr. 5, 2007.

* cited by examiner

*Primary Examiner*—Dah-Wei D Yuan
*Assistant Examiner*—Katherine Turner
(74) *Attorney, Agent, or Firm*—Kenyon & Kenyon LLP

(57) ABSTRACT

Packing according to the invention includes a cylinder portion which extends in a direction of an axis, and in which a diameter of a portion in one end side is increased when the packing is fitted to an object. The cylinder portion includes a fold portion which has a tortuous periphery in a cross section orthogonal to the direction of the axis.

13 Claims, 12 Drawing Sheets

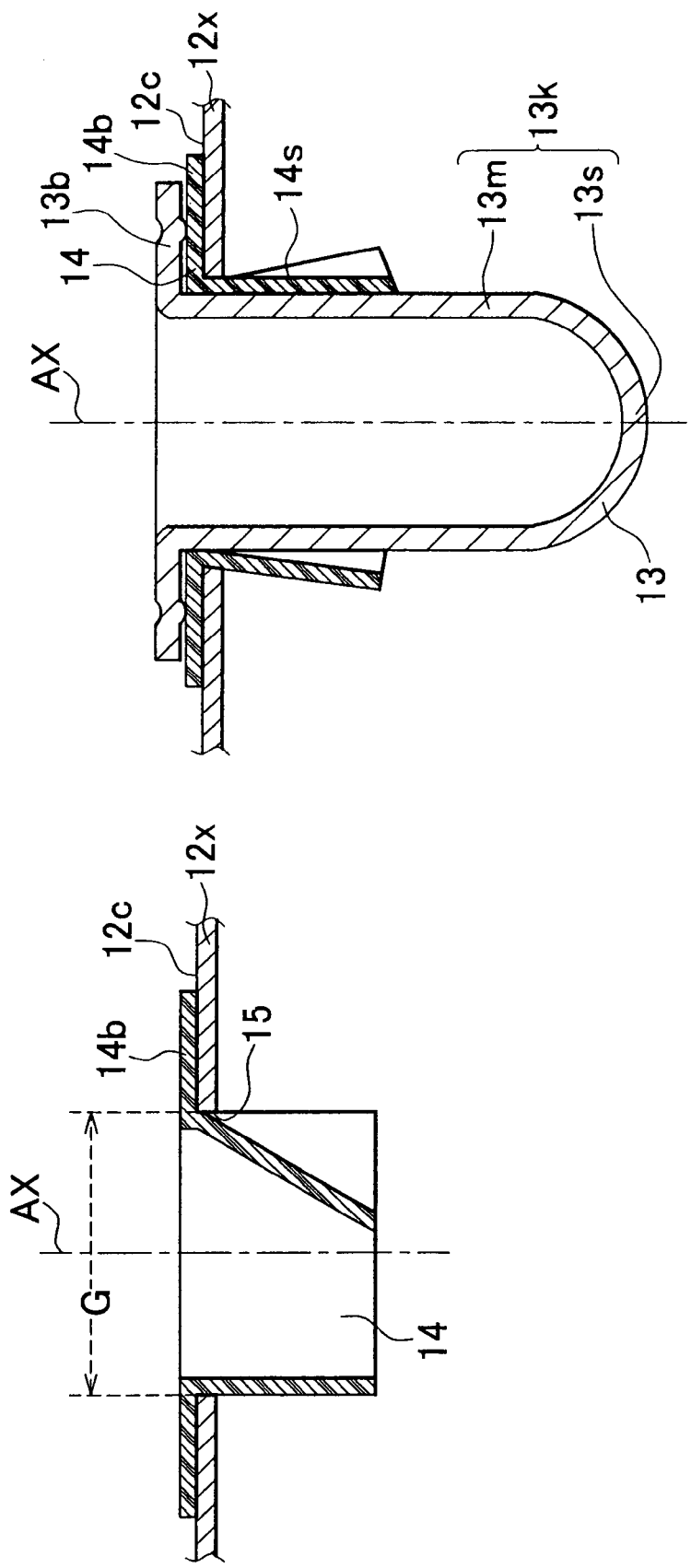

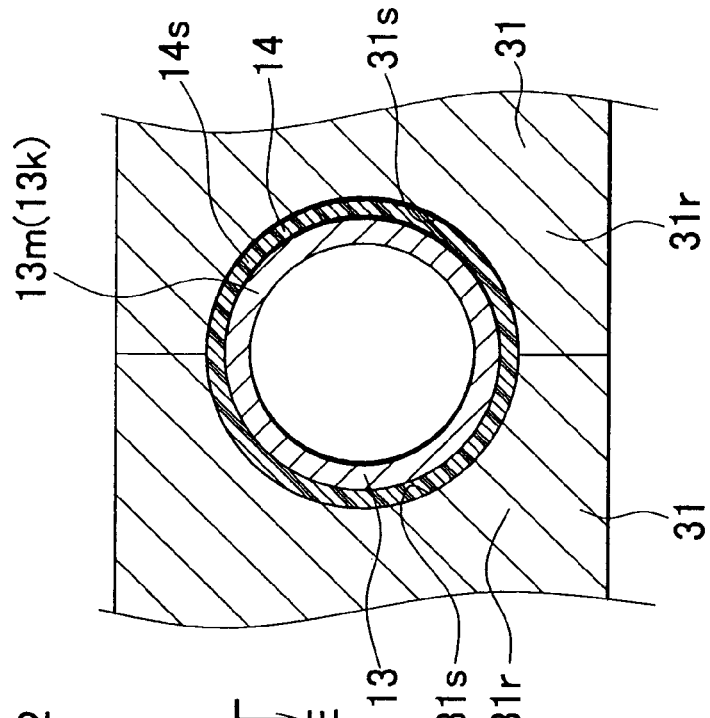
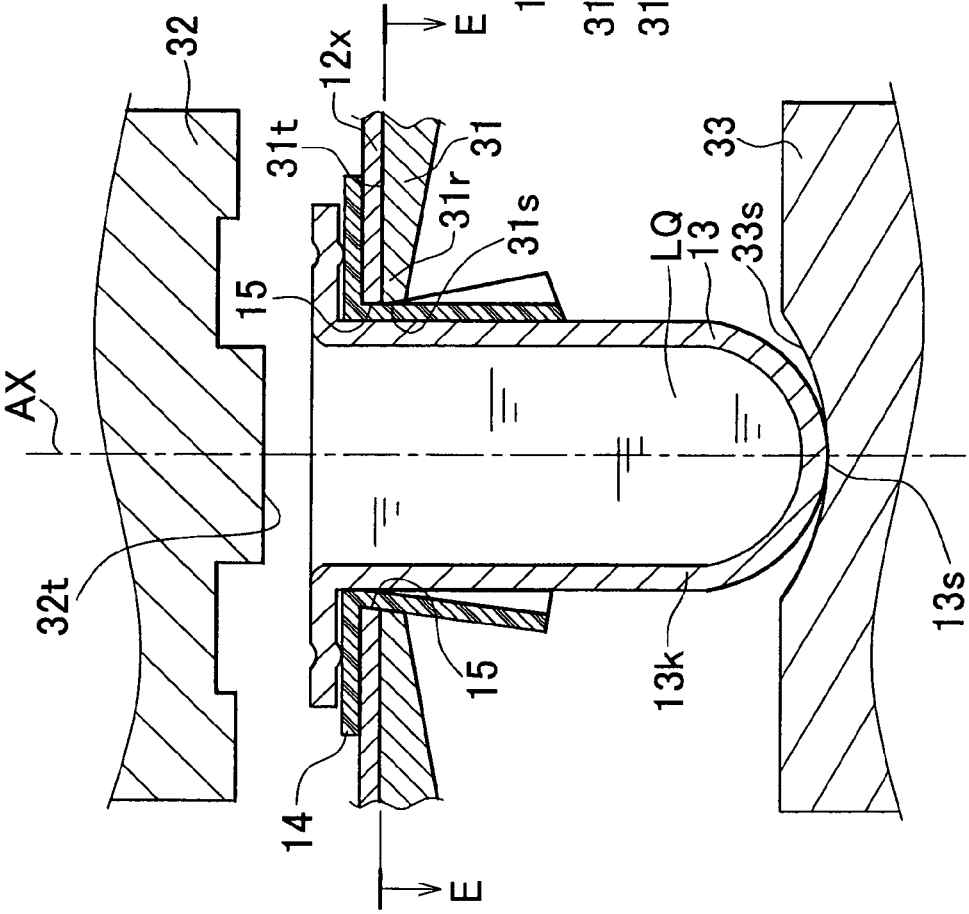
FIG. 7A
FIG. 7B

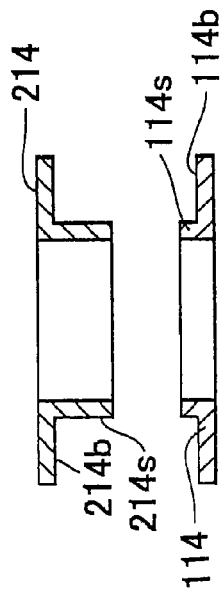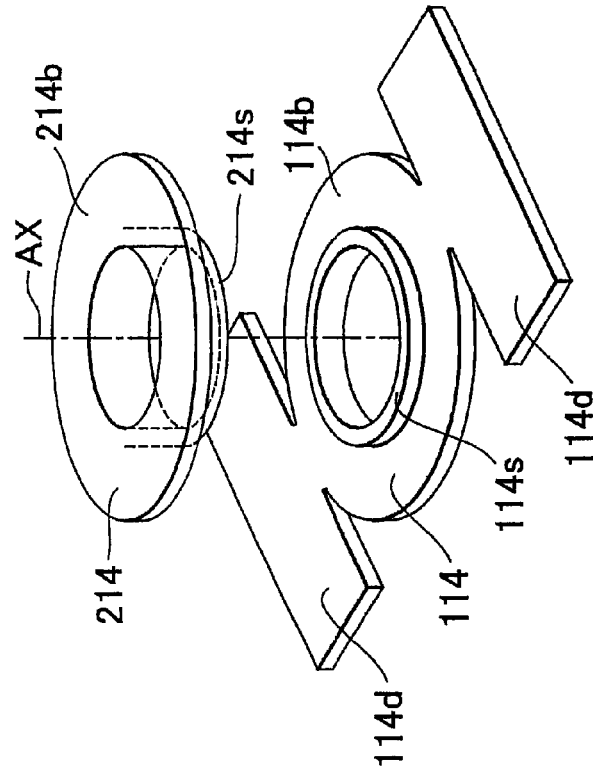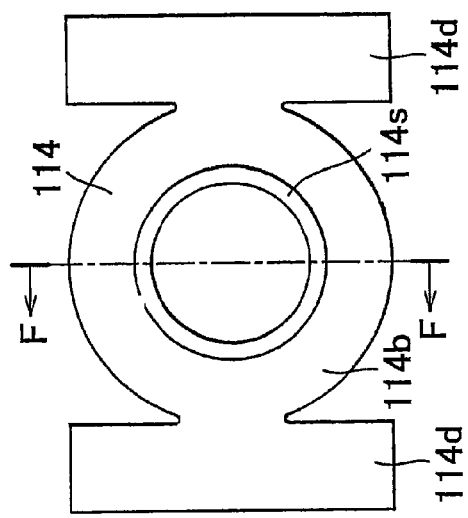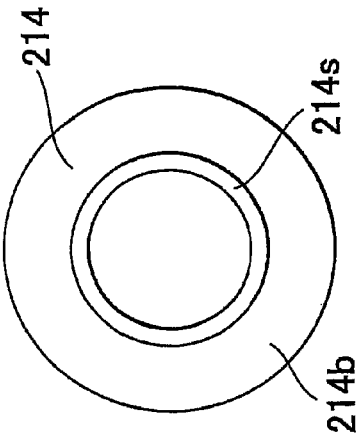

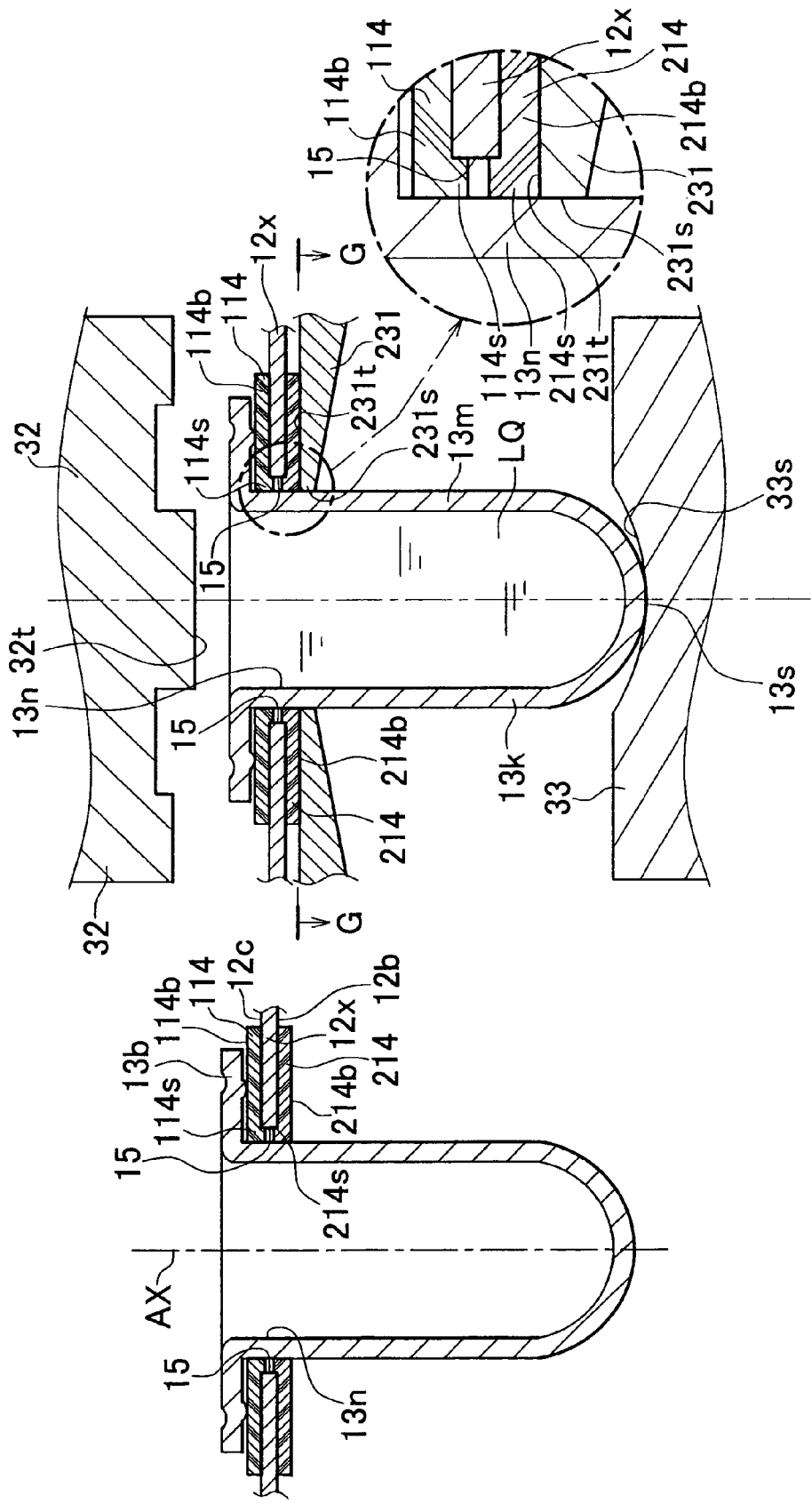

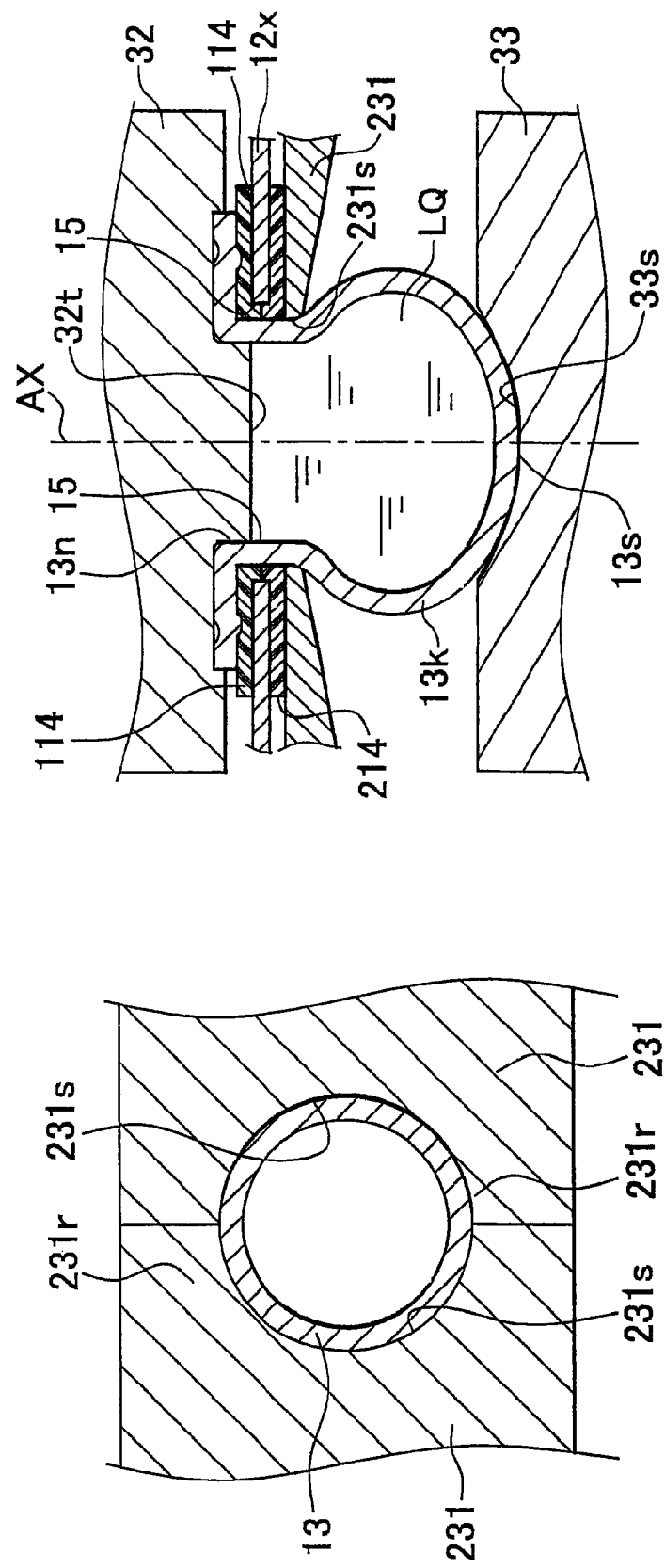

PACKING, PRODUCTION METHOD OF CRIMP ASSEMBLY, PRODUCTION METHOD OF BATTERY HOUSING LID, AND PRODUCTION METHOD OF BATTERY

INCORPORATION BY REFERENCE

The disclosure of Japanese Patent Application No. 2004-180213 filed on Jun. 17, 2004, including the specification, drawings and abstract is incorporated herein by reference in its entirety.

BACKGROUND OF THE INVENTION

1. Field of the Invention

The invention relates to packing which is used in a crimp assembly. Also, the invention relates to a production method of a crimp assembly using the packing, a production method of a battery housing lid using the packing, and a production method of a battery using the packing.

2. Description of the Related Art

When producing a crimp assembly by fitting a crimp member to an object by a crimping process, packing may be provided in a space between the object and the crimp member in order to make the space air-tight or fluid-tight. Examples of such a crimp assembly include a sealed secondary battery such as a lithium ion secondary battery or a nickel-hydrogen battery, and a battery housing lid thereof. The sealed secondary battery is installed in an electric vehicle and a hybrid vehicle. Also, the sealed secondary battery is used more and more widely as a power source and an auxiliary power source of the electric vehicle and the hybrid vehicle. Accordingly, there is an increasing demand for improving performance of the sealed secondary battery, for example, an increasing demand for high output capacity in the market. Also, there is an increasing demand for improving reliability of the sealed secondary battery, such as an increasing demand for preventing fluid leak even under a severe condition.

For example, a sealed battery disclosed in Japanese Patent Application Publication No. JP (A) 8-77999 includes a battery housing main body which has a bottomed hollow rectangular column shape, and which has an opening portion on one side; and a battery housing lid which closes the opening portion of the battery housing main body, and which has an insertion hole. Further, this battery includes plural electrode plates which generate electromotive force; a current collecting washer which is connected to each of the electrode plates; and a terminal member which is connected to the electrode plates. Among them, the terminal member includes a main body portion having a rectangular column shape; and a cylinder portion having a hollow cylindrical shape. Also, the main body portion of the terminal member is arranged outside the battery housing lid. One end of the cylinder portion of the terminal member is fixed to the main body portion. The other end of the cylinder portion of the terminal member is inserted in the insertion hole of the battery housing lid. Packing is provided between the terminal member and the battery housing lid. The packing is obtained by forming a resin member. The packing is formed so as to cover a surface of the main body portion facing the battery housing lid, and a surface of the cylinder portion facing an inner peripheral surface of the insertion hole. The packing functions as a seal member that provides air-tight sealing between the terminal member and the battery housing. In addition, the packing function as an insulation member between the battery housing lid and the terminal member. In the cylinder portion of the terminal member, an end portion which protrudes beyond the packing and the current collecting plate inside the battery housing lid is subjected to a crimping process.

However, in the aforementioned sealed battery, since the terminal member is solid except the lower end portion, the weight of the terminal member is heavy. Also, in the battery, the packing is simply compressed between the inside of the battery housing lid and the portion of the terminal member subjected to the crimping process, whereby electrolytic solution is sealed. In this configuration, there are variations in the sealing performance. As a result, it is difficult to reliably maintain high air-tightness and fluid-tightness for a long period.

Accordingly, inventors propose various structures of a sealed battery and various production methods thereof. One of the proposed sealed battery includes a metallic battery housing lid which constitutes a connection terminal with one pole; and a terminal member which is fitted to the battery housing lid in an insulating state, and which constitutes a connection terminal with the other pole. In the sealed battery, packing with an electric-insulating property is provided between the hollow cylindrical terminal member which is closed at one end, and a penetration hole for the terminal member, which is provided in the battery housing lid. Further, in the sealed battery, the packing is compressed by a compression deformation portion which bulges in a radial direction at one end of the terminal member so that sealing performance is obtained and the terminal member is fixed.

In this configuration, the hollow cylindrical terminal member which is closed at one end is used. Also, the sealing performance of the packing is obtained, and the terminal member is fixed by the compression deformation portion formed by deforming the portion at the end of the terminal member. Accordingly, since only the hollow cylindrical terminal member whose weight is light is used, weight and cost can be reduced. Further, high sealing performance can be reliably obtained.

Also, in a production method of the proposed sealed battery, first, the hollow cylindrical terminal member which is closed at one end is inserted in the penetration hole provided in the battery housing lid from the side of the one end, through the packing including the cylinder portion which has a cylindrical shape, and which has an electric insulating property and a plastic property, and a flange portion which is positioned at one end of the cylinder portion, and which expands outward in the radial direction. Next, in the terminal member, a portion at the one end which protrudes beyond the battery housing lid is caused to bulge outward in the radial direction by a bulging process. Subsequently, the portion of the terminal member is compressed in an axial direction to be deformed, whereby the sealing performance of the packing is obtained, and the terminal member is fixed. Further, an electrode plate group is housed in a battery housing main body, and the battery housing lid is joined to the battery housing main body. Finally, one end wall of the terminal member is joined to an end surface of the electrode plate group which has one polarity, and an end surface of the electrode plate group which has the other polarity is joined to a bottom wall of the battery housing main body, whereby the sealed battery is produced.

In this sealed battery, when the terminal member is fixed, the portion at one end of the terminal member is caused to bulge in the radial direction, and then is compressed in the axial direction so as to be deformed. Also, at this time, in the cylinder portion of the packing between the terminal member and the penetration hole of the battery housing lid, a diameter of a portion protruding beyond the battery housing lid is increased in the radial direction. In this case, strong tensile stress in the circumferential direction is applied to the portion whose diameter is increased, in the cylinder portion of the packing. Therefore, the portion to which the stress is applied may be torn or cracked. If such damage occurs in the packing, leakage of gas or fluid may occur at the damaged portion, and thus reliability of air tightness and fluid tightness may be decreased.

SUMMARY OF THE INVENTION

According to the invention, packing, a production method of a crimp assembly, a production method of a battery housing lid, and a production method of a battery are provided as described below. The packing according to the invention includes a cylinder portion which extends in a direction of an axis, and in which a diameter of a portion in one end side is increased when the packing is fitted to an object. The cylinder portion includes a fold portion which has a tortuous periphery in a cross section orthogonal to the direction of the axis.

With the aforementioned configuration, the cylinder portion of the packing includes the fold portion which has the tortuous periphery in the cross section orthogonal to the direction of the axis. In the cylinder portion of the packing, a peripheral length of a region including the fold portion is increased due to the fold portion, as compared to a case where the region does not include the fold portion. For example, a case is assumed in which the packing is fitted to an object which includes a first surface and a second surface, and an insertion hole extending from the first surface to the second surface. First, the packing is inserted in the insertion hole of the object from a side of the second surface. Next, a diameter of a portion which protrudes beyond the first surface of the object is increased in the cylinder portion of the packing, and the portion is deformed so as to be substantially parallel with the first surface of the object (i.e., the portion is deformed into a second flange process portion). The second flange process portion has a substantially L-shape or a substantially U-shape, and covers at least an entire periphery of the insertion hole in the first surface of the object. When the second flange process portion is formed by expanding and deforming the cylinder portion in the radial direction in the aforementioned manner, the cylinder portion is expanded in the circumferential direction. Therefore, tensile stress in the circumferential direction, which causes a crack in the second flange process portion, is likely to be generated in the packing. However, since the packing according to the invention includes the fold portion that is formed in the cylinder portion, the tensile stress in the circumferential direction can be reduced in the second flange process portion, at least at a portion which is formed by deforming the fold portion, as compared to a case where the packing does not include the fold portion in the cylinder portion. Accordingly, when using the packing according to the invention, a problem such as a tear or a crack is unlikely to occur in the second flange process portion, at least at a portion which is formed by deforming the fold portion. Thus, it is possible to configure the highly reliable crimp assembly.

Another packing according to the invention includes a first member including a cylinder portion which extends in a direction of an axis, and a flange portion which extends in a direction orthogonal to the direction of the axis, from one end of the cylinder portion, and a second member including a cylinder portion which extends in the direction of the axis, and which has an inner diameter that is substantially equal to an inner diameter of the cylinder portion of the first member, and a flange portion which extends in the direction orthogonal to the direction of the axis, from one end of the cylinder portion. The first member and the second member are fitted to an object which includes a first surface, a second surface that is on a reverse side of the first surface, and an insertion hole which extends from the first surface to the second surface. (i) The cylinder portion of the first member is inserted in the insertion hole from a side of the first surface such that the flange portion of the first member contacts the first surface of the object; and (ii) the cylinder portion of the second member is inserted in the insertion hole from a side of the second surface such that the flange portion of the second member contacts the second surface of the object, whereby an inner peripheral edge of the insertion hole is covered by the first member and the second member.

A production method of a crimp assembly according to the invention includes an arrangement step of arranging an object including an insertion hole, the aforementioned packing, and a crimp member including a shaft-like portion which extends in a direction of an axis, and a collar portion which is provided at one end of the shaft-like portion, and whose diameter is larger than a diameter of the insertion hole of the object; and a crimp step of forming a crimp assembly by fixing the packing and the crimp member to the object by a crimping process. The arrangement step includes a step of inserting the cylinder portion of the packing in the insertion hole of the object, and inserting the shaft-like portion of the crimp member in the insertion hole of the object and the cylinder portion of the packing such that the collar portion of the crimp member contacts the object, or at least one of a portion of the packing and an interposition member is arranged between the object and the collar portion of the crimp member. The crimp step includes a diameter-increase step of increasing a diameter of a portion which protrudes beyond the object in the shaft-like portion of the crimp member, and a diameter of a portion which protrudes beyond the object in the cylinder portion of the packing, and a pressing deformation step of deforming, by pressing, the portion whose diameter is increased in the shaft-like portion of the crimp member and the portion whose diameter is increased in the cylinder portion of the packing so that the portions become substantially parallel with one surface of the object, and the diameters of the portions become larger than the diameter of the insertion hole.

In the crimp step of the aforementioned production method, in the shaft-like portion of the crimp member, the diameter of the portion which protrudes beyond the object is increased, whereby the portion is deformed into a crimping process portion which is substantially parallel with the object, and whose diameter is larger than the diameter of the insertion hole of the object. At this time, in the cylinder portion of the packing that is arranged between a periphery of the insertion hole of the object and the crimp member, the diameter of the portion which protrudes beyond the object is increased, whereby the portion is deformed so as to be substantially parallel with the object, and to have the diameter larger than the diameter of the insertion hole.

However, in the production method of a crimp assembly according to the invention, since the packing including the fold portion that is formed in the cylinder portion is used, when the diameter of the portion which protrudes beyond the object is increased in the cylinder portion of the packing, a problem such as a tear or a crack is unlikely to occur. Accordingly, according to the production method of a crimp assembly according to the invention, it is possible to appropriately produce the highly reliable crimp assembly.

More specifically, for example, as the interposition member used in the production method of a crimp assembly according to the invention, a member having a ring disc shape may be employed.

Also, in the crimp step, in the crimp member, the diameter of the portion which protrudes beyond a first surface of the object is increased. The shaft-like portion of the crimp member that is used may have a solid bar-shape, a bottomless hollow cylindrical shape whose tip is opened, or a bottomed cylindrical shape. In the crimp step, in a case where the shaft-like portion of the crimp member has a solid bar-shape, for example, a diameter of a bar-shape portion is increased so that the bar-shape portion has a flange shape, using the same method as in the case of a known rivet. In a case where the shaft-like portion of the crimp member has a bottomless hollow cylindrical shape whose tip is opened, the diameter of the shaft-like portion is increased, for example, using the same method as in the case of a known rivet, or using a known flange process so that the shaft-like portion has a flange shape. Also, in a case where the shaft-like portion of the crimp member has a bottomed cylindrical shape, for example, a diameter of a closed portion is increased by a known bulging process so that the closed portion has a spherical shape, and further the closed portion is compressed so that the closed portion has a flange shape.

In a production method of a battery housing lid according to the invention, the object is a battery housing lid main body; the crimp member is a terminal member in which the shaft-like portion has a bottomed cylindrical shape, and one end of the shaft-like portion is closed; the packing is made of an insulative material; the diameter-increase step in the crimp step includes a bulging process step of causing a portion which protrudes beyond the battery housing lid main body to bulge by a bulging process in the shaft-like portion of the terminal member so that a bulge portion is formed, and increasing a diameter of a portion which protrudes beyond the battery housing lid main body in the cylinder portion of the packing; and the pressing deformation step in the crimp step includes a crushing step of crushing the bulge portion of the terminal member along a direction of the axis, and deforming the portion whose diameter is increased in the packing so that the portion has a flange shape.

With the configuration, the aforementioned packing which includes the fold portion that is formed in the cylinder portion, and which is made of the insulative material is used. Accordingly, when the diameter of the portion which protrudes beyond a first surface of the battery housing lid main body is increased in the cylinder portion of the packing, and the portion is crushed so that a second flange process portion is formed, a problem such as a tear or a crack is unlikely to occur. Therefore, it is possible to reliably maintain insulation and air-tightness between the terminal member and the battery housing lid. Thus, according to the production method of a battery housing lid, it is possible to appropriately produce the highly reliable battery housing lid.

Also, in a production method of a battery according to the invention, a battery housing lid obtained using the aforementioned production method of a battery housing lid is fitted to a battery housing main body.

With the configuration, the production method of a battery includes the aforementioned production method of a battery housing lid. Therefore, it is possible to appropriately produce the highly reliable battery housing lid. Accordingly, it is possible to appropriately produce the highly reliable battery.

Also, another production method of a crimp assembly according to the invention includes an arrangement step of arranging an object which includes an insertion hole, packing which includes a flat plate portion that has a flat ring shape and includes a penetration hole; and a crimp member which includes a shaft-like portion that can be inserted in the insertion hole and the penetration hole, and a collar portion that is provided at one end of the shaft-like portion, and has a diameter larger than a diameter of the insertion hole; and a crimp step of forming a crimp assembly by fixing the packing and the crimp member to the object by a crimping process. The arrangement step includes a step of inserting the shaft-like portion of the crimp member in the insertion hole of the object and the penetration hole of the packing such that the flat plate portion of the packing contacts the object and the collar portion of the crimp member contacts the object, or an interposition member is arranged between the object and the collar portion of the crimp member. The crimp step includes a diameter-increase step of increasing a diameter of a portion which protrudes beyond the object in the shaft-like portion of the crimp member, and a deformation step of deforming the portion whose diameter is increased in the shaft-like portion of the crimp member so that the portion becomes substantially parallel with the object, and the diameter of the portion becomes larger than the diameter of the insertion hole.

With the configuration, in the crimp step, in the shaft-like portion of the crimp member, the diameter of the portion which protrudes beyond a first surface of the object is increased, whereby the portion is deformed into a crimping process portion which is substantially parallel with the first surface of the object, and whose diameter is larger than the diameter of the insertion hole of the object. At this time, the packing that is arranged between a periphery of the insertion hole of the object and the crimp member includes the flat plate portion having a flat ring shape. Therefore, in the crimp step, a diameter of the flat plate portion of the packing is not increased, and therefore tensile stress is not applied to this portion. Accordingly, a problem such as a tear or a crack is unlikely to occur. Thus, according to the production method of a crimp assembly according to the invention, it is possible to appropriately produce the highly reliable crimp assembly.

When the interposition member is used in the production method of a crimp assembly according to the invention, it is possible to employ, for example, an interposition member having a ring disc shape, or an interposition member including a cylinder portion whose length is less than a thickness of the object, and a flange portion which is provided at one end of the cylinder portion, and has a ring disc shape.

According to the invention, in the crimp step, in the crimp member, the diameter of the portion which protrudes beyond a first surface of the object is increased. The shaft-like portion of the crimp member may have a solid bar-shape, a bottomless hollow cylindrical shape whose tip is opened, or a bottomed cylindrical shape. In the crimp step, in a case where the shaft-like portion of the crimp member has a solid bar-shape, for example, a diameter of a bar-shape portion is increased so as to have a flange shape using the same method as in the case of a known rivet. In a case where the shaft-like portion of the crimp member has a bottomless hollow cylindrical shape whose tip is opened, the diameter of the shaft-like portion is increased, for example, using the same method as in the case of a known rivet, or using a known flange process so that the shaft-like portion has a flange shape. Also, in a case where the shaft-like portion of the crimp member has a bottomed cylindrical shape, for example, a diameter of a closed portion is increased by a bulging process so that the closed portion has a spherical shape, and further the closed portion is compressed so that the closed portion has a flange shape.

In another production method of a battery housing lid according to the invention, the object is a battery housing lid main body; the crimp member is a terminal member in which the shaft-like portion has a bottomed cylindrical shape, and one end of the shaft-like portion is closed; the packing is made of an insulative material; the diameter-increase step in the crimp step includes a bulging process step of causing a portion which protrudes beyond the battery housing lid main body to bulge by a bulging process in the shaft-like portion of the terminal member so that a bulge portion is formed; and the pressing deformation step in the crimp step includes a crushing step of crushing the bulge portion of the terminal member along a direction of the axis.

With the configuration, in the bulging process step, the portion which protrudes beyond a first surface of the battery housing lid main body is caused to bulge by a bulging process in the shaft-like portion of the terminal member so that the bulge portion is formed. Also, in the crushing step, the bulge portion of the terminal member is crushed toward the first surface of the battery housing lid main body along the direction of the axis so that a crimping process portion is formed. The packing that is arranged between the insertion hole and the first surface of the battery housing lid main body and the crimping process portion includes the flat plate portion having a flat ring shape. Therefore, in the crimp step and the crushing step, a diameter of the flat plate portion of the packing is not increased, and therefore tensile stress is not applied to this portion. Accordingly, a problem such as a tear or a crack is unlikely to occur. Thus, according to the production method of a battery housing lid according to the invention, it is possible to appropriately produce the highly reliable battery housing lid.

Further, in another production method of a battery according to the invention, a battery housing lid that is obtained using the aforementioned production method of a battery housing lid is fitted to a battery housing main body.

With the configuration, since the production method of a battery includes the aforementioned production method of a battery housing lid, it is possible to appropriately produce the highly reliable battery housing lid. Accordingly, it is possible to appropriately produce the highly reliable battery.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which:

FIGS. 6A and 6B are a vertical cross sectional view showing an arrangement step of arranging the packing and the terminal member in a production method of the sealed battery according to the first embodiment of the invention;

FIG. 7A is a vertical cross sectional view showing a bulge step in the production method of the sealed battery according to the first embodiment of the invention;

FIG. 7B is a cross sectional view taken along line E-E in FIG. 7A;

FIG. 9A and FIG. 9B are top views each showing the packing used in producing a sealed battery according to a second embodiment of the invention;

FIG. 9C is a cross sectional view taken along line F-F in FIG. 9A;

FIG. 9D is a perspective view showing the packing shown in each of FIG. 9A and FIG. 9B;

FIG. 10A is a cross sectional view showing an arrangement step of arranging the packing and the terminal member in a production method of the sealed battery according to the second embodiment of the invention;

FIG. 10B is a vertical cross sectional view showing a bulge step in the production method of the sealed battery according to the second embodiment of the invention;

FIG. 11A is a cross sectional view taken along line G-G in FIG. 10B;

FIG. 11B is a cross sectional view showing a bulge step in the production method of the sealed battery according to the second embodiment of the invention.

DETAILED DESCRIPTION OF THE EXEMPLARY EMBODIMENTS

A sealed battery according to each of embodiments of the invention will be described with reference to FIG. 1 to FIG. 8.

Figure 1:
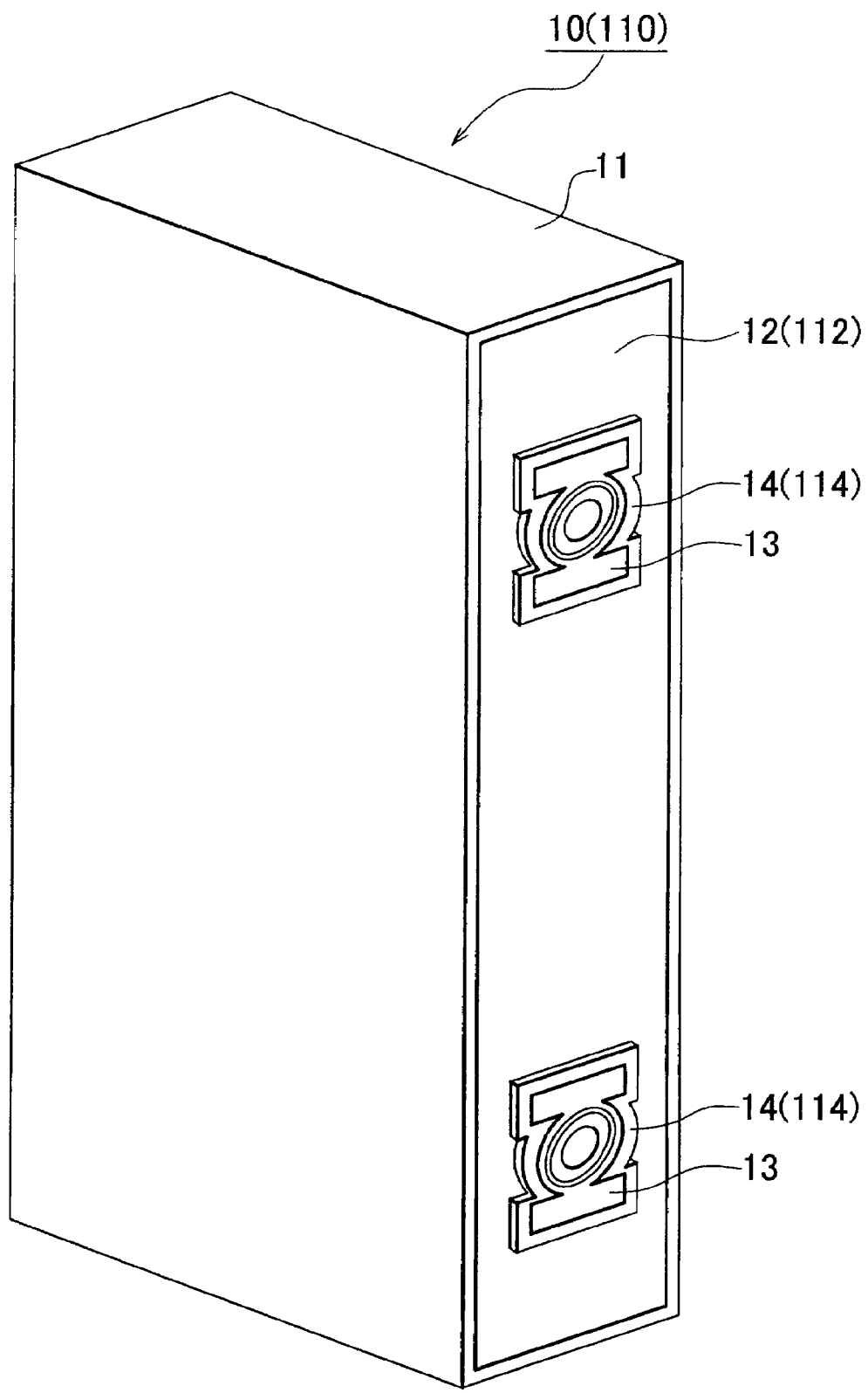
FIG. 1 is an explanatory diagram showing an exterior appearance of a sealed battery according to a first embodiment of the invention.
Figure 2A:
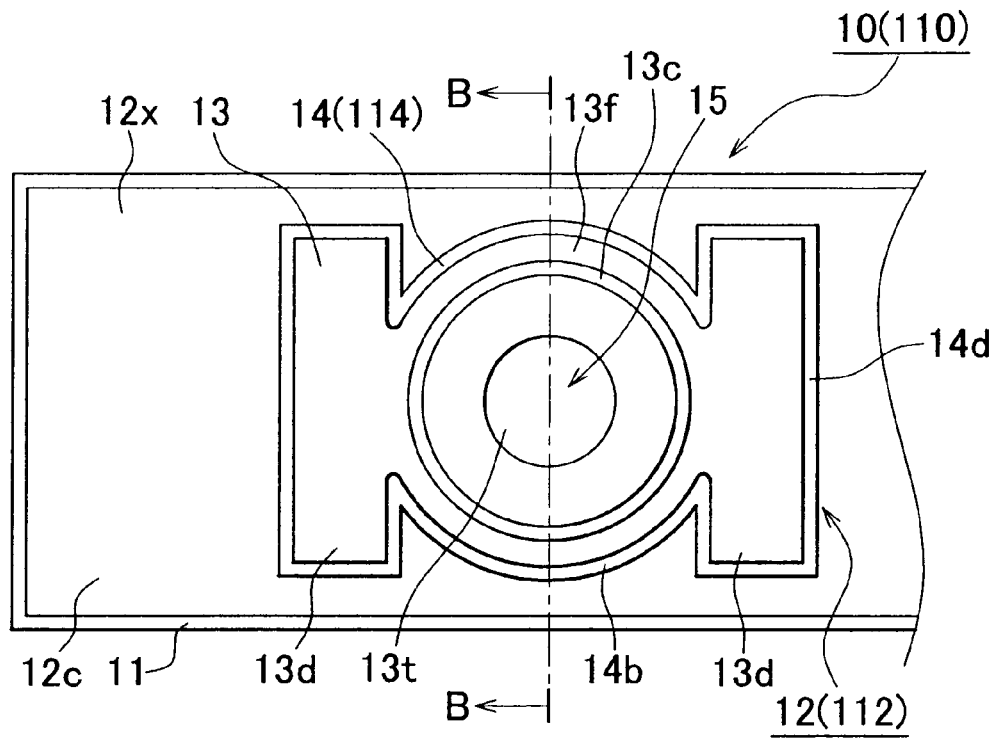
FIG. 2A is a top view showing an enlarged main portion of FIG. 1.
Figure 2B:
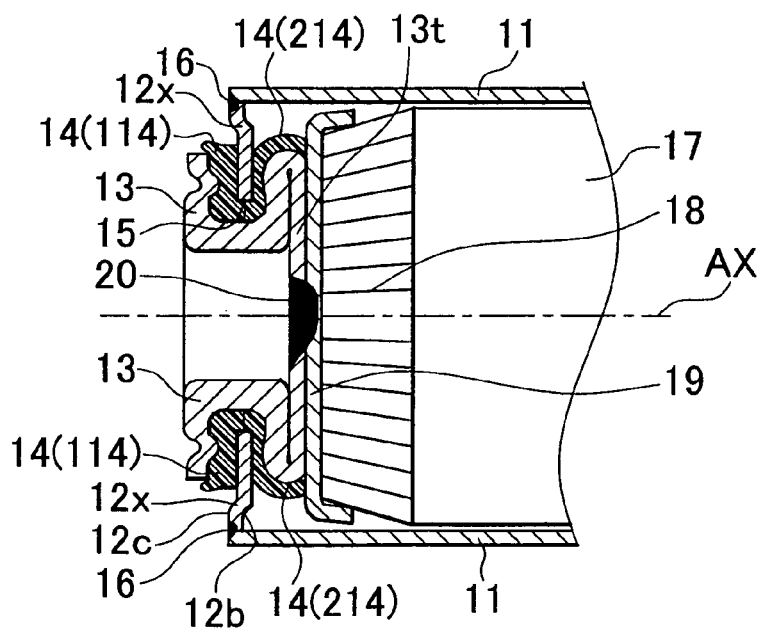
FIG. 2B is a cross sectional view taken along line B-B in FIG. 2A.

A first embodiment of the invention will be described. FIG. 1 is an explanatory diagram showing an exterior appearance of a sealed battery 10 according to a first embodiment of the invention. FIG. 2A is a view showing an enlarged main portion of the sealed battery 10. FIG. 2B is a cross sectional view taken along line B-B in FIG. 2A. As shown in FIG. 1, the sealed battery 10 includes a metallic battery housing main body 11 which has a bottomed rectangular column shape; and a battery housing lid 12 which closes an opening of the battery housing main body 11. The battery housing main body 11 and the battery housing lid 12 are fixed to each other by laser welding at a main body side welding portion 16. A negative electrode outer connection terminal (not shown) is fixed to an outside of a bottom portion of the battery housing main body 11.

As shown in FIG. 2B, an insertion hole 15 which extends from a first surface 12b (an inner side surface of the sealed battery 10) to a second surface 12c (an outer side surface of the sealed battery 10) is provided in a battery housing lid main body 12x. A terminal member 13 which is a positive external connection terminal is fitted to the insertion hole 15 with packing 14 being arranged between a periphery of the insertion hole 15 and the terminal member 13. The packing 14 is fitted in order to maintain air-tightness, fluid-tightness, and insulating performance in the battery housing main body 11.

Figure 3:
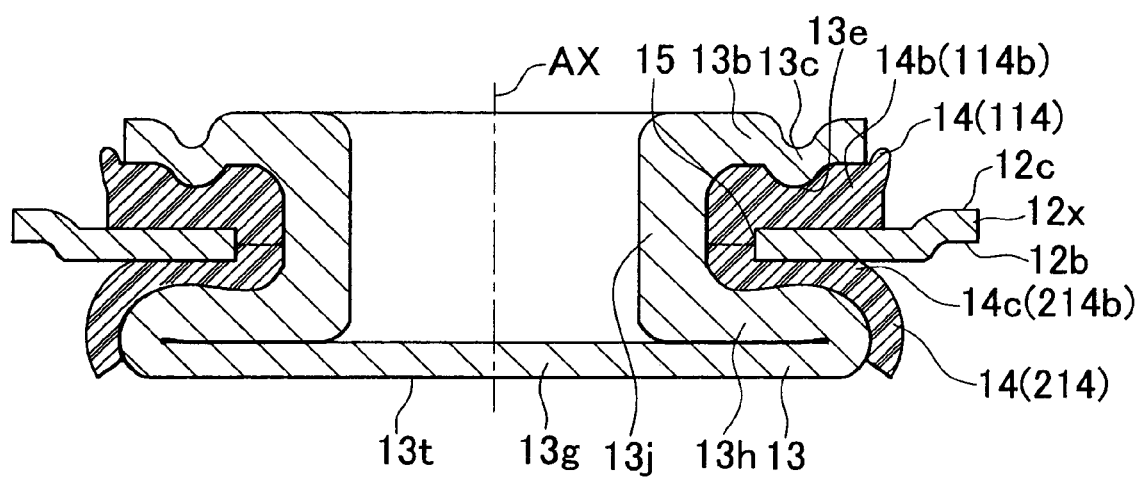
FIG. 3 is a vertical cross sectional view showing a terminal member and packing which are fitted to a penetration hole of a battery housing lid main body.

FIG. 3 is a vertical cross sectional view showing the terminal member 13 and the packing 14 which are fitted in the insertion hole 15 of the battery housing lid main body 12. Among them, the terminal member 13 includes an inner cylinder portion 13$j$ having a cylindrical shape; a collar portion 13$b$; and a crimping process portion 13$g$. The inner cylinder portion 13$j$ is positioned inside the insertion hole 15 with the packing 14 being arranged between the periphery of the insertion hole 15 and the inner cylinder portion 13$j$. The collar portion 13$b$ is provided at one end of the inner cylinder portion 13$j$ (as shown in an upper portion in FIG. 3). The collar portion 13$b$ has a ring shape whose diameter is larger than a diameter of the insertion hole 15. The crimping process portion 13$g$ is provided at the other end of the inner cylinder portion 13$j$ so as to be substantially parallel with the first surface 12$b$ of the battery housing lid main body 12$x$ (as shown in a lower portion in FIG. 3). The crimping process portion 13$g$ has a disc shape whose diameter is larger than a diameter of the insertion hole 15. The crimping process portion 13$g$ includes a bottom surface portion 13$t$ having a disc shape; and a folded portion 13$h$ which is folded at an outer peripheral end, and which is continuous with the inner cylinder portion 13$j$. Also, a flange portion 14$b$ of the packing 14 is arranged between the collar portion 13$b$ of the terminal member 13 and the second surface 12$c$ of the battery housing lid main body 12$x$. Further, a second flange process portion 14$c$ of the packing 14 is arranged between the crimping process portion 13$g$ of the terminal member 13 and the first surface 12$b$ of the battery housing lid main body 12$x$.

The battery housing lid main body 12$x$ is sandwiched between the collar portion 13$b$ and the crimping process portion 13$g$ of the terminal member 13 by a crimping process, with the flange portion 14$b$ and the second flange process portion 14$c$ of the packing 14 being arranged therebetween. Thus, the terminal portion 13 is fixed in the insertion hole 15. Also, the flange portion 14$b$ and the second flange process portion 14$c$ of the packing 14 are compressed, whereby the terminal member 13 closely contacts the packing 14, and the battery housing lid 12 closely contacts the packing 14. Thus, air-tightness and fluid-tightness in the sealed battery 10 are ensured.

Further, in the embodiment, in the collar portion 13$b$ of the terminal member 13, a bending portion 13$c$ having a ring shape and a convex surface 13$e$ thereof are formed in the vicinity of a center portion in the radial direction of the collar portion 13$b$. The convex surface 13$e$ protrudes toward the flange portion 14$b$ of the packing 14. Air-tightness and fluid-tightness can be maintained at a higher level in the flange portion 14$b$ of the packing 14 against which the convex surface 13$e$ is pressed.

The terminal member 13 includes a pair of connection portions 13$d$ each of which has a substantially rectangular plate shape, and is provided outside a periphery of the collar portion 13$b$ in the radial direction. The sealed battery 10 is connected to another sealed battery and the like at the connection portions 13$d$.

Also, the packing 14 includes outside portions 14$d$ which are arranged such that the periphery of the outside portions 14$d$ is positioned outside the periphery of the connection portions 13$d$. The outside portions 14$d$ have a shape substantially similar to a shape of the connection portions 13$d$. The outside portions 14$d$ are arranged between the connection portions 13$d$ of the terminal member 13 and the second surface 12$c$ of the battery housing lid main body 12$x$. The outside portions 14$d$ provide insulation between the connection portions 13$d$ and the second surface 12$c$.

Further, the sealed battery 10 houses an electrode plate group 17 including plural positive and negative electrode plates which generate electromotive force and separators and electrolytic solution; a lead portion 18 connected to the electrode plates; a current collecting plate 19 connected to one end of the lead portion 18. Also, the current collecting plate 19 is fixed by laser welding to the bottom surface portion 13$t$ which is one end of the terminal member 13, at a welding portion 20.

Next, description will be made of a production method of the battery housing lid 12 of the sealed battery 10 according to the first embodiment of the invention, with reference to FIG. 4 to FIG. 7.

First, description will be made of the terminal member 13 and the packing 14 before fitted to the battery housing main body 12$x$.

Figure 4A:
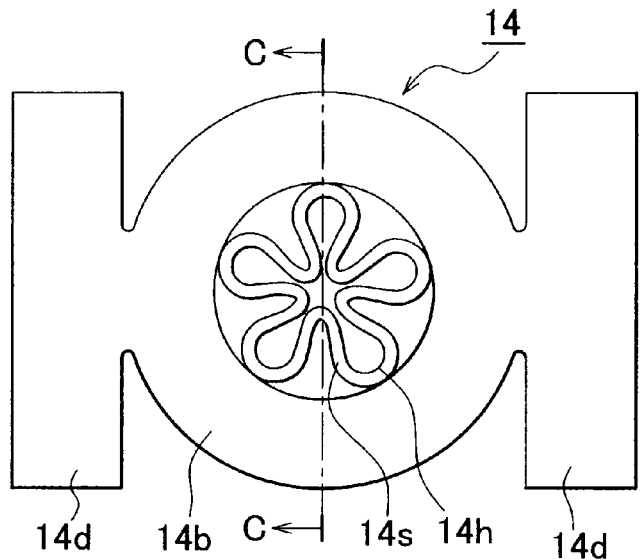
FIG. 4A is a top view showing the packing used in producing the sealed battery according to the first embodiment of the invention.
Figure 4B:
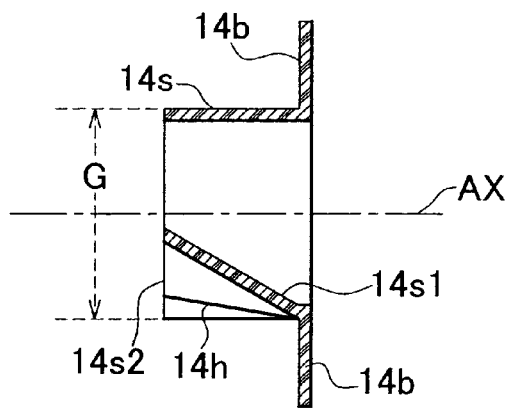
FIG. 4B is a cross sectional view taken along line C-C in FIG. 4A.
Figure 4C:
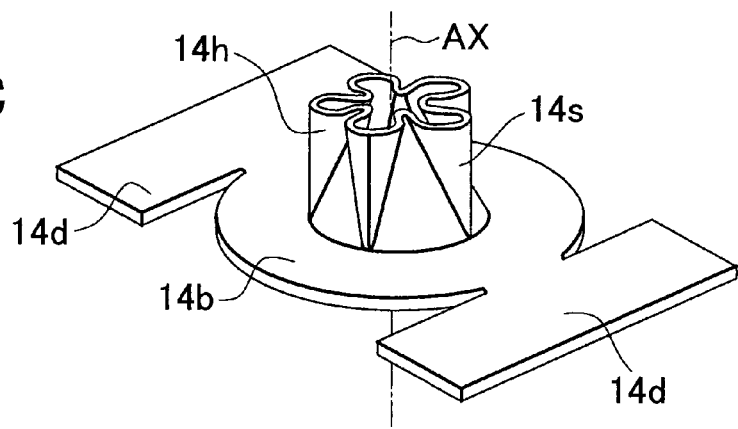
FIG. 4C is a perspective view showing the packing in FIG. 4A.

FIGS. 4A to 4C are explanatory diagrams each showing a shape of the packing 14 used for assembly. FIG. 4A is a top view; FIG. 4B is a vertical cross sectional view; and FIG. 4C is a perspective view. The packing 14 has a plastic property, and is made of resin such as nylon. The packing 14 includes a cylinder portion 14$s$ which extends in a direction of an axis AX; and a flange portion 14$b$ which has a flat ring shape, and which expands from one end of the cylinder portion 14$s$ in the radial direction orthogonal to the direction of the axis AX. This flange portion 14$b$ serves as insulation between the battery housing lid main body 12$x$ and the terminal member 13. In the first embodiment, since the packing 14 integrally includes the flange portion 14$b$, handling of the packing 14 is easy, and thus the battery housing lid 12 can be easily produced. Also, the packing 14 includes the pair of outside portions 14$d$ that are provided outside the periphery of the flange portion 14$b$ in the radial direction with the flange portion 14$b$ being provided between the outside portions 14$d$.

Also, the cylinder portion 14$s$ of the packing 14 includes a fold portion 14$h$. A cross section of the fold portion 14$h$ in a direction orthogonal to the direction of the axis AX has a tortuous shape. The fold portion 14$h$ is formed in the cylinder portion 14$s$ from an end 14$s$1 (an lower end in FIG. 4C) at which there is the flange portion 14$b$ to an end 14$s$2 (an upper end in FIG. 4C) in a tip side of the cylinder portion 14$s$. The fold portion 14$h$ is formed such that a peripheral length of the fold portion 14$h$ in a cross section orthogonal to the direction of the axis AX becomes larger toward the end 14$s$2 that is opposite to the end 14$s$1 of the flange portion 14$b$. Further, the cylinder portion 14$s$ is formed such that a diameter G of a virtual circle circumscribing the cylinder portion 14$s$ in a cross section orthogonal to the direction of the axis AX is uniform over an entire height in the direction of the axis AX, as shown by a dashed line in FIG. 4B.

Figure 5A:
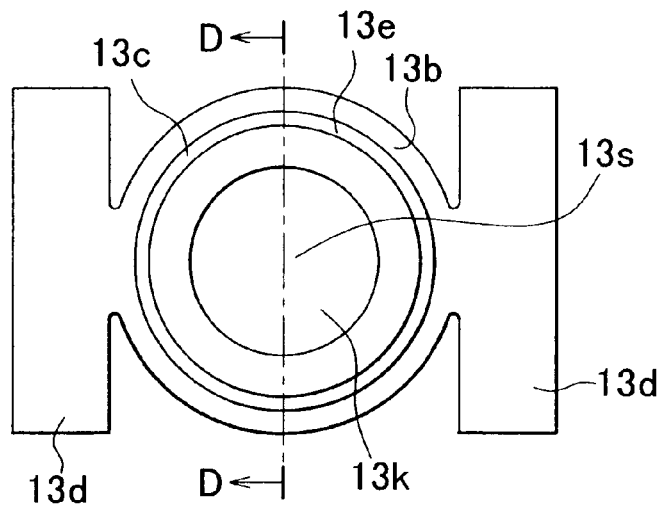
FIG. 5A is a top view showing the terminal member used in producing the sealed battery according to the first embodiment.
Figure 5B:
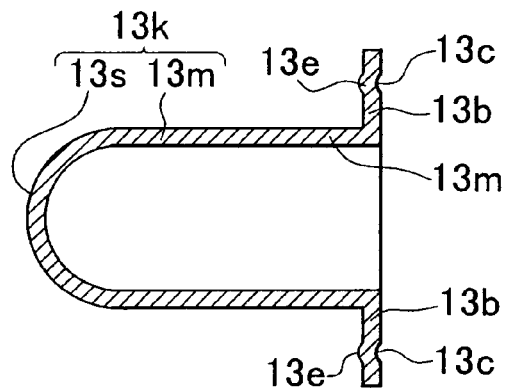
FIG. 5B is a cross sectional view taken along line D-D in FIG. 4A.
Figure 5C:
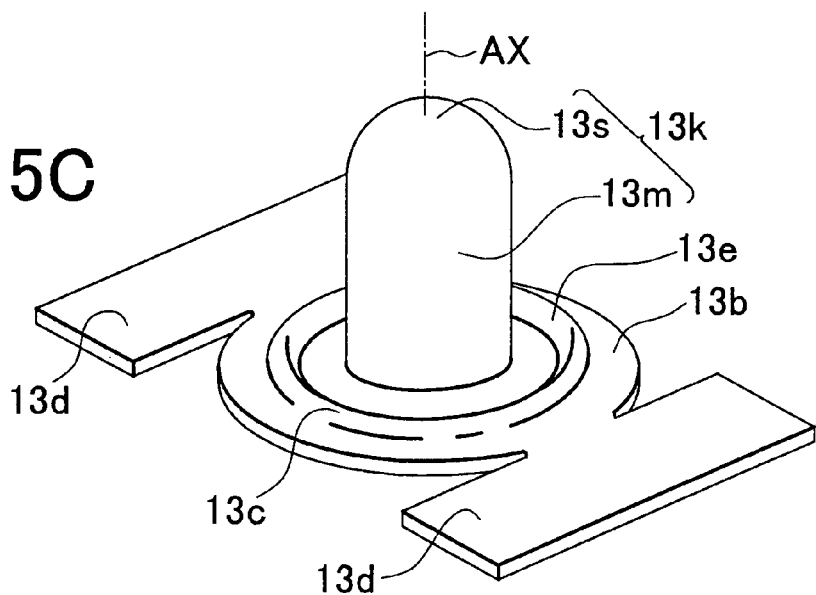
FIG. 5C is a perspective view showing the terminal member shown in FIG. 5A.

FIGS. 5A to 5C are explanatory diagrams each showing a shape of the terminal member 13 used in assembly. FIG. 5A is a top view; FIG. 5B is a cross sectional view; and FIG. 5C is a perspective view. The metallic terminal member 13 includes a shaft-like portion 13$k$ which has a bottomed cylindrical shape, and which extends in the direction of the axis AX; a tip portion 13$s$ which is a tip of the shaft-like portion 13$k$; and the collar portion 13$b$ which has a ring disc shape, and which is provided at one end of the shaft-like portion 13$k$ (i.e., at a lower end in FIG. 5C). The shaft-like portion 13$k$ has an outer diameter which can be inserted in the insertion hole 15 of the battery housing lid main body 12$x$. An outer diameter of the collar portion 13$b$ is set to be larger than the diameter of the insertion hole 15. The shaft-like portion 13$k$ includes a cylinder portion 13$m$ having a cylindrical shape;

and the tip portion 13s which has a semispheric shape, and which is positioned at the tip of the shaft-like portion 13k. Further, the pair of connection portions 13d are provided outside the periphery of the collar portion 13b in the radial direction.

Next, description will be made of a method of fitting the terminal member 13 and the packing 14 to the battery housing lid main body 12x, with reference FIG. 6 and FIG. 7.

FIG. 6A and FIG. 6B show an arrangement step of arranging the terminal member 13 and the packing 14 at predetermined positions. First, as shown in FIG. 6A, the packing 14 is inserted in the insertion hole 15 of the battery housing lid main body 12x that is arranged such that the second surface 12c faces upward. At this time, the flange portion 14b of the packing 14 contacts the second surface 12c of the battery housing lid main body 12x. As described above, the cylinder portion 14s is formed such that the diameter G of the virtual circle circumscribing the cylinder portion 14 in the cross section orthogonal to the direction of the axis AX is smaller than an inner diameter of the insertion hole 15, and is uniform in the direction of the axis AX. Accordingly, the packing 14 can be easily inserted in the insertion hole 15 of the battery housing lid main body 12x.

Next, as shown in FIG. 6B, the shaft-like portion 13k of the terminal member 13 is inserted in the cylinder portion 14s of the packing 14 from the side of the second surface 12c of the battery housing main body 12x (an upper portion in FIG. 6B). At this time, the fold portion 14h is expanded. After insertion, the collar portion 13b of the terminal member 13 contacts the flange portion 14b of the packing 14. Thus, the tip portion 13s and a portion of the cylinder portion 13m in the shaft-like portion 13k of the terminal member 13 protrude beyond the first surface 12b of the battery housing main body 12x.

Next, the bulge step is performed. First, setting of members is performed as shown in FIGS. 7A and 7B. In this bulge step, a pair of split molds 31, 31 and a pair of an upper mold 32 and a lower mold 33 are used. Each of the split molds 31, 31 can be linearly moved in the direction orthogonal to the axis AX (in a horizontal direction in FIG. 7A, and a horizontal direction in FIG. 7B). Each of the upper mold 32 and the lower mold 33 can be linearly moved in the direction of the axis AX (in a vertical direction of FIG. 7A).

First, the split molds 31, 31 are set so as to prevent deformation of the insertion hole 15 and the like due to bulging. The split molds 31, 31 are formed such that a circle hole is formed when both of the split molds 31, 31 are fitted to each other. A diameter of the circle hole is equal to a value obtained by adding a thickness of the cylinder portion 14s of the packing 14 to a diameter of the cylinder portion 13m. The split molds 31, 31 are symmetrical to each other, and each of the molds 31, 31 has a substantially plate shape. In an inner end portion 31r constituting the aforementioned circle hole, a curvature of an inner peripheral end surface 31s is set to a value substantially equal to a curvature that would be set if a cylinder portion having a thickness twice as large as the thickness of the cylinder portion 14s of the packing 14 that is actually fitted to the cylinder portion 13m were fitted to the cylinder portion 13m. The split molds 31, 31 are fitted to each other with a contact surface 31t contacting the battery housing lid main body 12x. Then, as shown in FIG. 7B, in the cylinder portion 14s of the packing 14, a portion which is in the vicinity of the insertion hole 15 can be surrounded by the inner peripheral end surfaces 31s, 31s of the split molds 31, 31.

Next, the lower mold 33 is set. The lower mold 33 contacts the tip portion 13s of the terminal member 13, and is pressed to the tip portion 13s of the terminal member 13. The lower mold 33 includes a pressing surface 33s having a spherical surface whose curvature is smaller than that of the tip portion 13s of the terminal member 13. The tip portion 13s of the terminal member 13 is caused to contact the pressing surface 33s of the lower mold 33.

Next, oil LQ is filled in the shaft-like portion 13k of the terminal member 13. The oil LQ is used as fluid for applying pressure to the shaft-like portion 13k from an inner side thereof, as described later.

Further, as described later, the upper mold 32 is arranged above an opening portion 13n of the terminal member 13. The upper mold 32 closes an opening portion 13n side of the terminal member 13 (an upper side in FIG. 7A), and is pressed to the opening portion 13n side, as described later. A convex portion 32t is formed in the upper mold 32 so as to apply pressure to the oil LQ filled in the shaft-like portion 13k of the terminal member 13. The convex portion 32t has a solid column shape, and is inserted in the shaft-like portion 13k. The convex portion 32t has a diameter substantially equal to an inner diameter of the shaft-like portion 13k of the terminal member 13 in order to prevent leakage of the oil LQ from a gap between the shaft-like portion 13k and the convex portion 32t.

Figure 8A:
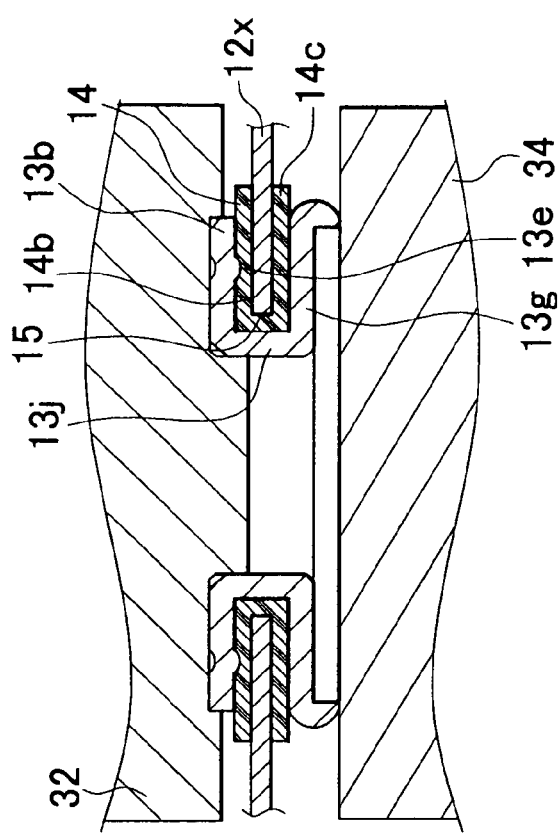
FIG. 8A is a cross sectional view showing a bulge step in the production method of the sealed battery according to the first embodiment of the invention.

Next, as shown in FIG. 8A, the bulging process is performed. In the bulging process, the shaft-like portion 13k is partially expanded from the inner side thereof by applying pressure to the oil LQ. First, the pair of the upper mold 32 and the lower mold 33 that can be moved along the axis AX are caused to come close to each other. Then, the shaft-like portion 13k of the terminal member 13 is compressed in the axial direction. Since the convex portion 32t of the upper mold 32 is inserted in this shaft-like portion 13k, pressure is applied to the oil LQ. When the pressure of the oil LQ is increased, in the shaft-like portion 13k of the terminal member 13, a portion which protrudes beyond the split molds 31, 31 in the direction of the axis AX is caused to bulge outward. Also, in the cylinder portion 14s of the packing 14a, a portion which protrudes beyond the split molds 31, 31 in the direction of the axis AX is caused to bulge outward. In the cylinder portion 14s, a portion which contacts the inner periphery end surfaces 31s, 31s of the split molds 31, 31 is restrained from being caused to bulge outward by the split molds 31, 31. Also, in the shaft-like portion 13k, a portion on a base end side is restrained from being caused to bulge outward by the split molds 31, 31. Accordingly, there is no possibility that a periphery of the insertion hole 15 is deformed when the portion in the shaft-like portion 13k of the terminal member 13 and the portion in the cylinder portion 14s of the packing 14 are caused to bulge outward.

The lower mold 33 includes the pressing surface 33s having the spherical shape whose curvature is smaller than that of the tip portion 13s of the shaft-like portion 13k of the terminal member 13. Therefore, when the shaft-like portion 13k of the terminal member 13 is caused to bulge and is deformed, the tip of the terminal member 13 is not crushed to be flat, and the lower mold 33 is appropriately pressed to the tip of the terminal member 13. Thus, the shaft-like portion 13k of the terminal member 13 is deformed so as to bulge outward substantially equally around the axis AX.

Figure 8B:
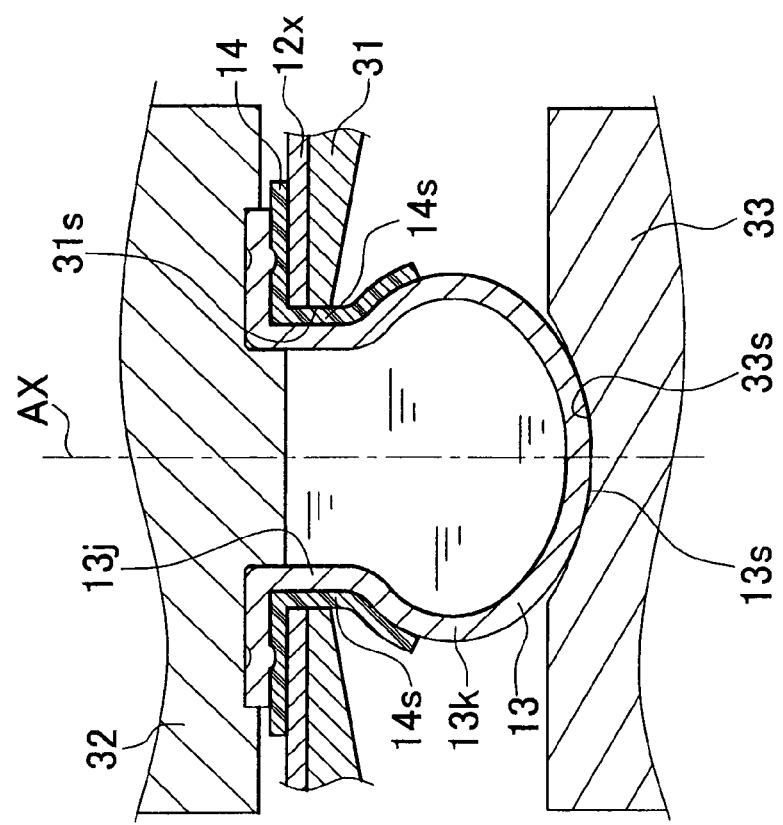
FIG. 8B is a cross sectional view showing a crushing step in the production method of the sealed battery according to the first embodiment of the invention.

Further, in a crushing step shown in FIG. 8B, the portions which are caused to bulge in the bulge step are deformed so as to have a flat flange shape. First, the oil LQ in the shaft-like portion 13k of the terminal member 13 is discharged, and each of the split molds 31, 31 is separated from the portion in the vicinity of the insertion hole 15. Next, a lower mold 34 including a flat pressing surface 34s is used, instead of the lower mold 33, and the shaft-like portion 13k of the terminal member 13 is compressed in the direction of the axis AX between the upper mold 32 and the lower mold 34. Then, in the shaft-like portion 13k, a portion which protrudes beyond the first surface 12b of the battery housing lid main body 12x is crushed so as to be flat. That is, as shown in FIG. 8B, in the shaft-like portion 13k, the portion is deformed into the crimping process portion 13g that is substantially parallel with the battery housing lid main body 12x.

Thus, since a portion in the periphery of the insertion hole 15 in the battery housing lid main body 12x is held between the collar portion 13b and the crimping process portion 13g, the terminal member 13 is fixed to the battery housing lid main body 12x. Also, since the terminal member 13 is pressed to the flange portion 14b and the second flange process portion 14c of the packing 14, the first surface 12b of the battery housing lid main body 12x closely contacts the second flange process portion 14c of the packing 14, and the second surface 12c of the battery housing lid main body 12x closely contacts the flange portion 14b of the packing 14. As a result, the terminal member 13 is provided in the battery housing lid 12 while air-tightness and fluid-tightness in the battery housing main body 11 is maintained.

Meanwhile, in the cylinder portion 14s of the packing 14, a portion which protrudes beyond the first surface 12b of the battery housing lid main body 12x in the direction of the axis AX is deformed and the diameter thereof is increased when the diameter of the shaft-like portion 13k is increased, as shown in FIG. 8A. Finally, the portion is formed into the second flange process portion 14c between the battery housing lid main body 12× and the terminal member 13, as shown in FIG. 8B. The second flange process portion 14c may be torn or cracked due to the tensile stress generated in the circumferential direction when the diameter of the shaft-like portion 13k is increased.

However, as shown in FIGS. 4A to 4C, the packing 14 in the first embodiment includes the fold portion 14h that is formed in the cylinder portion 14s. Since the fold portion 14h is formed in the cylinder portion 14s, the outer peripheral edge of the cylinder portion 14s is set to be long as compared to a case where the fold portion 14h is not formed in the cylinder portion 14s. Therefore, when the cylinder portion 14s is expanded in the circumferential direction such that the diameter of the cylinder portion 14s is increased, the tensile stress can be reduced. That is, in the packing 14 in the first embodiment, occurrence of a problem such as a tear or a crack is prevented in the second flange process portion 14c, at least at a portion which is formed by deforming the fold portion 14h.

Particularly, in the packing 14 in the first embodiment, the fold portion 14h reaches the end 14s2 in the tip side of the cylinder portion 14s, as shown in FIG. 4. Since the length of the outer peripheral edge is increased by the fold portion 14h at the end 14s2, the tensile stress can be reduced also at the end 14s2 after the diameter of the cylinder portion 14s is increased. That is, in the packing 14 in the first embodiment, since the fold portion 14h is formed also in a portion near the end 14s2 in the tip side of the cylinder portion 14s, in which a problem is most likely to occur, it is possible to prevent occurrence of a problem such as a tear or a crack in this portion.

Further, in the packing 14 in the first embodiment, the fold portion 14h is formed such that a width of a fold increases toward the tip (an upper portion in FIG. 4C). A degree of deformation caused by increasing the diameter of the cylinder portion 14s increases toward the tip. Accordingly, since the packing 14 has the aforementioned form, the generated tensile stress can be made uniform in the portion whose diameter is increased in the cylinder portion 14s, after the diameter thereof is increased, as compared to packing which does not have the aforementioned form. As a result, in the packing 14 in the first embodiment, it is possible to appropriately prevent a problem such as a tear or a crack in the second flange process portion 14c.

As described above, according to the production method of the battery housing lid main body 12x in the first embodiment, it is possible to prevent occurrence of a problem such as a tear or a crack in the packing 14. Thus, it is possible to appropriately produce the highly reliable battery housing lid main body 12x.

Subsequently, description will be made of a production method of the sealed battery 10 according to the first embodiment. However, since the production method is the same as a known method except a step of fitting the aforementioned terminal member 13 and the aforementioned packing 14 to the battery housing lid main body 12x, the production method will be briefly described.

First, the electrode plate group 17, the lead portion 18, and the current collecting plate 19 are fitted to the battery housing main body 11 using a known method. Next, the bottom surface portion 13t of the terminal member 13 in the battery housing lid main body 12x produced using the aforementioned method, and the current collecting plate 19 with one pole that is fitted to the battery housing main body 11 together with the electrode plate group 17 and the lead portion 18 are fixed to each other at the welding portion 20 by laser welding. Next, the assembled battery housing lid main body 12× and the battery housing main body 11 are fixed to each other at the main body side welding portion 16 by laser welding. Further, a current collecting plate with the other pole (not shown) is fixed to the bottom portion of the battery housing main body 11 by laser welding. Finally, electrolytic solution is supplied through an electrolytic solution supply inlet (not shown). Thus, the sealed battery 10 is produced.

The production method of the sealed battery 10 in the first embodiment includes the production method of the battery housing lid 12 using the packing 14. Accordingly, it is possible to appropriately produce the highly reliable battery housing lid 12. Further, it is possible to appropriately produce the highly reliable sealed battery 10.

Hereinafter, description will be made of a production method of a sealed battery 110 and a battery housing lid 112 according to a second embodiment with reference to FIG. 1 to FIG. 3, and FIG. 9 to FIG. 12. However, the second embodiment is the same as the first embodiment, except that first packing 114 and second packing 214 are used instead of the packing 14 in the first embodiment. Hereinafter, description will be made with emphasis on different portions, and description of the same portions will be omitted or simplified.

First, the first packing 114 and the second packing 214 that are used in this embodiment will be described. FIGS. 9A to 9D are explanatory diagrams showing the first packing 114 and the second packing 214 that are used in producing the battery housing lid 112. FIG. 9A is a top view showing the first packing 114; FIG. 9B is a top view showing the second packing 214; FIG. 9C is a cross sectional view showing the first packing 114 and the second packing 214, taken along line F-F; and FIG. 9D is a perspective exploded view showing the first packing 114 and the second packing 214.

Each of the first packing 114 and the second packing 214 is made of resin having a plastic property. The first packing 114 includes a cylinder portion 114s which has a cylindrical shape, and which extends in the direction of the axis AX; and a flange portion 114b which has a flat ring shape, and which expands from one end of the cylinder portion 114s in the radial direction orthogonal to the direction of the axis AX. Further, the first packing 114 includes a pair of outside portions 114d that are provided outside the periphery of the flange portion 114b in the radial direction with the flange portion 114b being provided between the outside portions 1114d.

Also, the second packing 214 includes a cylinder portion 214s which extends in the direction of the axis AX; and a flat plate portion 214b which has a flat ring shape, and which expands from one end of the cylinder portion 214s in the radial direction orthogonal to the direction of the axis AX.

Next, description will be made of a method of fitting the terminal member 13, the first packing 114, and the second packing 214 to the battery housing lid main body 12x, with reference to FIG. 10 to FIG. 12.

FIG. 10A shows an arrangement step of arranging members at predetermined positions. First, the cylinder portion 114s of the first packing is inserted in the insertion hole 15 of the battery housing lid main body 12x that is arranged with the second face 12c facing upward. After insertion, the flange portion 114b of the first packing 114 contacts the second surface 12c of the battery housing lid main body 12x.

Next, the shaft-like portion 13k of the terminal member 13 is inserted in the cylinder portion 114s of the first packing 114 from the side of the second surface 12c (an upper portion in FIG. 10A) of the battery housing main body 12x. After insertion, the collar portion 13b of the terminal member 13 contacts the flange portion 114b of the first packing 114.

Further, the second packing 214 is fitted to the terminal member 13 from the side of the first surface 12b of the battery housing lid main body 12x. Also, the cylinder portion 214s of the second packing 214 is inserted in the insertion hole 15. After insertion, the flat plate portion 214b of the second packing 214 contacts the first surface 12b of the battery housing lid main body 12x.

Next, the bulge step is performed. First, setting of members is performed as shown in FIG. 10B. In this bulge step, a pair of split molds 231, 231 that is similar to the pair of split molds 31, 31 in the first embodiment, and the pair of the upper mold 32 and the lower mold 33 are used.

First, the split molds 231, 231 are set so as to surround a base end portion of a portion (a lower portion in FIG. 10B) which protrudes beyond the insertion 15 and the flat plate portion 214b of the second packing 214 in the shaft-like portion 13k of the terminal member 13. The split molds 231, 231 are similar to the split molds 31, 31 used in the first embodiment. However, the split molds 231, 231 are different from the split molds 31, 31 in that a circle hole whose diameter is substantially equal to an outer diameter of the opening portion 13n is formed when both of the split molds 231, 231 are fitted to each other. More specifically, tip portions 231r, 231r of the split molds 231, 231 are fitted to each other with contact surfaces 231t, 231t of the split molds 231, 231 contacting the flat plate portion 214b of the second packing 214. Then, as shown in FIG. 11A, a portion in the vicinity of the insertion hole 15 (opening portion 13n) in the shaft-like portion 13k of the terminal member 13 is surrounded by inner peripheral end surfaces 231s, 231s of the split molds 231, 231.

Next, the lower mold 33 which is pressed to the tip of the terminal member 13 is set in the same manner as in the first embodiment. Further, the oil LQ is filled in the shaft-like portion 13k of the terminal member 13. Then, the upper mold 32 which is pressed to the opening portion 13n of the terminal member 13 is arranged above the opening portion of the terminal member 13, as in the first embodiment.

Next, the bulge step is performed. In the bulge step, pressure is applied to the oil LQ, and the shaft-like portion 13k is partially expanded from the inner side thereof using the pressure, as shown in FIG. 11B. First, the pair of the upper mold 32 and the lower mold 33 that can be moved along the axis AX are caused to come close to each other. Then, the shaft-like portion 13k of the terminal member 13 is compressed in the direction of the axis AX. Also, since the convex portion 32t of the upper mold 32 is inserted in the shaft-like member 13k, pressure is applied to the oil LQ. Since the pressure is applied to the oil LQ, the pressure of the oil LQ is increased. Accordingly, in the shaft-like portion 13k of the terminal member 13, a portion in the tip side is caused to bulge outward. Meanwhile, in the shaft-like portion 13k, a portion which contacts the split molds 231, 231 is restrained from being caused to bulge outward. Since the insertion hole 15 and the flat plate portion 214b of the second packing 214 are closer to the base end of the shaft-like portion 13k than the split molds 231, 231, there is no possibility that the insertion hole 15 and the flat plate portion 214b of the second packing 214 are deformed due to influence of expanding the shaft-like portion 13k of the terminal member 13 outward.

In the second embodiment as well, the shaft-like portion 13k of the terminal member 13 is deformed so as to bulge outward substantially equally around the axis AX.

Figure 12:
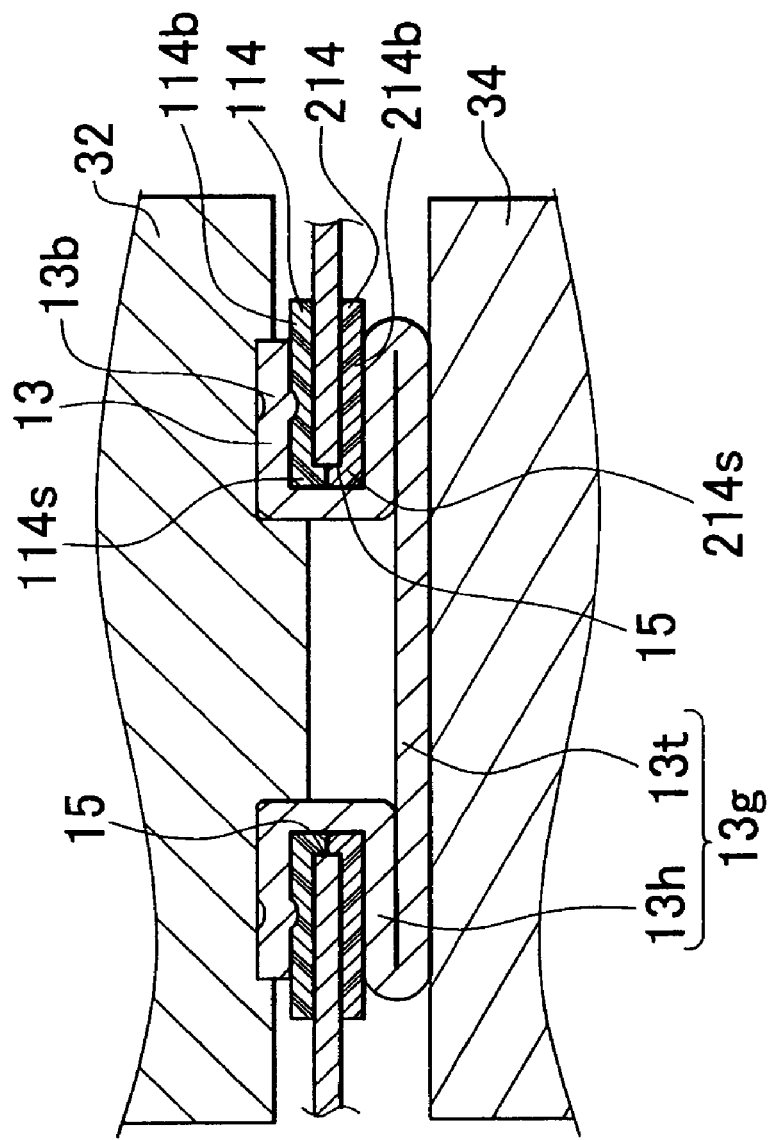
FIG. 12 is a cross sectional view showing a crushing step in the production method of the sealed battery according to the second embodiment of the invention.

Next, as shown in FIG. 12, the portion which is caused to bulge in the bulge step is deformed so as to have a flat flange shape in the crushing step. First, the oil LQ is discharged from the terminal member 13, and the split molds 231, 231 are separated from each other. Next, the lower mold 34 including the flat pressing surface 34s is used, and the shaft-like portion 13k of the terminal member 13 is further compressed in the direction of the axis AX between the upper mold 32 and the lower mold 34. Then, the shaft-like portion 13k is crushed so as to be flat, and is deformed into the crimping process portion 13g that is substantially parallel with the battery housing lid main body 12x by the crimping process. In the production method of the battery housing lid 112 in the second embodiment, since the portion in the periphery of the insertion hole 15 in the battery housing lid main body 12x is held between the collar portion 13b and the crimping process portion 13g, the terminal member 13 is fixed to the battery housing lid main body 12x. Also, the terminal member 13 is pressed to the flange portion 114b of the first packing 114 and the flat plate portion 214b of the second packing 214. Thus, the first surface 12b of the battery housing lid main body 12x closely contacts the flat plate portion 214b of the second packing 214, and the flat plate portion 214b closely contacts the folded portion 13h of the terminal member 13. As a result, the terminal member 13 is provided in the battery housing lid 12 while air-tightness and fluid-tightness in the battery housing main body 11 is maintained.

In the production method of the battery housing lid 112 in the second embodiment, in the shaft-like portion 13k of the terminal member 13, the portion which protrudes beyond the first surface 12b of the battery housing lid main body 12x is caused to bulge by a bulging process in the bulge step. More specifically, in the shaft-like portion 13k of the terminal member 13, the portion which protrudes beyond the flat plate portion 214b of the second packing 214 is caused to bulge by the bulging process. Thus, the bulge portion is formed. Also, in the crushing step, the bulge portion of the terminal member 13 is crushed toward the first surface 12b of the battery housing lid main body 12x in the direction of the axis AX, whereby the crimping process portion 13g is formed. The second packing 214 which is arranged between the insertion hole 15 and the first surface 12b of the battery housing lid main body 12x and the crimping process portion 13g includes the flat plate portion 214b having the flat ring shape. Therefore, when the aforementioned bulge step and the crushing step are performed, stress is not applied to the flat plate portion 214b of the second packing 214, and a diameter of the flat plate portion 214b is not increased. Accordingly, a problem such as a tear or a crack is unlikely to occur in the flat plate portion 214b. According to the production method of the battery housing lid 112, it is possible to appropriately produce the highly reliable battery housing lid 112.

The sealed battery 110 is produced in the same manner as in the first embodiment. Therefore, description of production of the sealed battery 110 will be omitted. As shown in FIG. 1 to FIG. 3, the sealed battery 110 is the same as the sealed battery 10 in the first embodiment, except that the two members, that are, the first packing 114 and the second packing 214 are used instead of the packing 14.

FIG. 3 is a vertical cross sectional view showing the terminal member 13, the first packing 114, and the second packing 214 which are fitted to the insertion hole 15 of the battery housing lid main body 12x. The terminal member 13 includes the inner cylinder portion 13j having a cylindrical shape; the collar portion 13b; and the crimping process portion 13g. The inner cylinder portion 13j is positioned inside the insertion hole 15 with the first packing 114 and the second packing 214 being arranged between the periphery of the insertion hole 15 and the inner cylinder portion 13j. The collar portion 13b is provided at one end of the inner cylinder portion 13j (as shown in the upper portion in FIG. 3). The collar portion 13b has a ring shape whose diameter is larger than the diameter of the insertion hole 15. The crimping process portion 13g is provided at the other end of the inner cylinder portion 13j so as to be substantially parallel with the first surface 12b of the battery housing lid main body 12x (as shown in the lower portion in FIG. 3). The crimping process portion 13g has a disc shape whose diameter is larger than the diameter of the insertion hole 15. The crimping process portion 13g includes the folded portion 13h which is folded at the outer peripheral end, and which is continuous with the inner cylinder portion 13j. Also, the flange portion 114b of the first packing 114 is arranged between the collar portion 13b of the terminal member 13 and the second surface 12c of the battery housing lid main body 12x. Further, the flat plate portion 214b of the second packing 214 is arranged between the crimping process portion 13g of the terminal member 13 and the first surface 12b of the battery housing lid main body 12x.

The production method of the sealed battery 110 according to the second embodiment includes the production method of appropriately producing the battery housing lid 112 using the first packing 114 and the second packing 214. Accordingly, it is possible to appropriately produce the highly reliable battery housing lid 112. Further, it is possible to appropriately produce the highly reliable sealed battery 110.

While the first embodiment and the second embodiment of the invention have been described, the invention is not limited to the aforementioned embodiments. It is needless to say that various modifications can be made to the aforementioned embodiments without departing from the true spirit of the invention. For example, in the production methods of the battery housing lid 12, 112 in the first embodiment and the second embodiment, the bulging process is used as the crimping process. However, it is possible to employ a method in which a solid shaft-like portion is used, and a diameter of the solid shaft-like portion is increased like a rivet. Also, according to the invention, packing which does not include a flange portion may be used. However, it is preferable to employ the packing 14 including the flange portion 14b in the first embodiment, or the packing 114 including the flange portion 114b in the second embodiment. Also, in a case where packing does not include a flange portion, an interposition member may be provided instead of the flange portion in the first embodiment or the second embodiment. Even in a case where packing includes a flange portion, the interposition member may be provided together with the flange portion. Further, in the first embodiment and the second embodiment, the packing is used for the sealed battery. However, use of the packing is not limited to the sealed battery.

While the invention has been described with reference to exemplary embodiments thereof, is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A battery packing, comprising:
a cylinder portion having first and second ends which extends in a direction of an axis, and in which a diameter of a portion in the second end is increased when the packing is fitted to an object,
wherein the cylinder portion includes a fold portion which has a tortuous periphery in a cross section orthogonal to the direction of the axis, and
wherein when the packing is fitted to the object, a terminal member for a battery is inserted in the cylinder portion, and a diameter of a portion in the second end in the cylinder portion is increased.

2. The battery packing according to claim 1, wherein the fold portion is formed all over the portion whose diameter is increased in the cylinder portion.

3. The battery packing according to claim 1, further comprising a flange portion which extends in a direction orthogonal to the direction of the axis, from the first end of the cylinder portion, a diameter of the first end being not increased when the packing is fitted to the object.

4. The battery packing according to claim 1, wherein the fold portion is formed such that a peripheral length of the fold portion in the cross section orthogonal to the direction of the axis is increased toward the second end of the cylinder portion.

5. The battery packing according to claim 1, wherein the cylinder portion is formed such that a diameter of a virtual circle circumscribing the cylinder portion in the cross section orthogonal to the direction of the axis is uniform irrespective of a distance from one end whose diameter is not increased when the packing is fitted to the object, or the diameter of the virtual circle is decreased toward one end whose diameter is increased when the packing is fitted to the object.

6. The battery packing according to claim 1, wherein the cylinder is made of a plastic material.

7. A battery packing, comprising:
a cylinder portion having first and second ends and extending in a direction of an axis, a diameter of a portion of the second end of the cylinder portion increasing when fitted to an object, the cylinder portion includes a fold portion which has a tortuous periphery in a cross section orthogonal to the direction of the axis; and
a flange portion having a substantially flat ring shape which extends from the first end of the cylinder portion in a direction orthogonal to the axis, and wherein when the packing is fitted to the object, a terminal member for a battery is inserted in the cylinder portion, and a diameter of a portion in the second end in the cylinder portion is increased.

8. The battery packing according to claim 7, wherein the cylinder portion and the flange are made of a resin.

9. The battery packing according to claim 7, wherein the cylinder portion and the flange are made of nylon.

10. The battery packing according to claim 7, wherein the flange portion serves as insulation for the battery.

11. The battery packing according to claim 7, further comprising a pair of outside portions provided outside of the flange portion in a radial direction with the flange portion being provided between the pair of outside portions.

12. A battery packing configured for use in a vehicle, comprising:

a cylinder portion having first and second ends which extends in a direction of an axis, and in which a diameter of a portion in the second end is increased when the packing is fitted to an object, wherein the cylinder portion includes a fold portion which has a tortuous periphery in a cross section orthogonal to the direction of the axis, and wherein the fold portion is formed such that a peripheral length of the fold portion in the cross section orthogonal to the direction of the axis is increased toward the second end of the cylinder portion, and wherein when the packing is fitted to the object, a terminal member for a battery is inserted in the cylinder portion, and a diameter of a portion in the second end in the cylinder portion is increased.

13. The battery packing according to claim 12, wherein the object is a battery housing.

\* \* \* \* \*

UNITED STATES PATENT AND TRADEMARK OFFICE
CERTIFICATE OF CORRECTION

PATENT NO. : 7,700,229 B2 Page 1 of 1
APPLICATION NO. : 11/147311
DATED : April 20, 2010
INVENTOR(S) : Shinji Hamada et al.

It is certified that error appears in the above-identified patent and that said Letters Patent is hereby corrected as shown below:

| Column | Line | |
|---|---|---|
| 15 | 6 | Change "1114$d$" to --114$d$--. |

Signed and Sealed this

Thirty-first Day of August, 2010

David J. Kappos
*Director of the United States Patent and Trademark Office*